United States Patent [19]

Gerdes

[11] Patent Number: 4,635,673

[45] Date of Patent: Jan. 13, 1987

[54] ACCESSORY FAUCET

[75] Inventor: Gerald E. Gerdes, Wallingford, Conn.

[73] Assignee: WPM, Inc., Waterbury, Conn.

[21] Appl. No.: 708,287

[22] Filed: Mar. 5, 1985

[51] Int. Cl.$^4$ .................. F16K 31/52; F16K 31/60
[52] U.S. Cl. .................................. 137/216; 137/801;
 210/418; 210/433.2; 251/251; 251/353;
 251/354; 251/263; 285/162
[58] Field of Search .................. 137/216, 801;
 210/257.2, 418, 433.2, 449; 251/251, 352, 353,
 354, 262, 263; 285/161, 162, 206

[56] References Cited

U.S. PATENT DOCUMENTS

| 218,135 | 8/1879 | Rich | 251/353 |
|---|---|---|---|
| 2,621,746 | 12/1952 | Beauregard | 251/354 |
| 3,620,241 | 11/1971 | Brown | 137/216 |
| 3,967,638 | 7/1976 | Tondreau | 137/216 |
| 4,134,419 | 1/1979 | Richetti | 137/216 |
| 4,210,533 | 7/1980 | Ash | 137/216 |
| 4,234,218 | 11/1980 | Rogers | 285/162 |
| 4,260,130 | 4/1981 | Brehm | 251/353 |
| 4,454,891 | 6/1984 | Dreibelbis et al. | 137/216 |

FOREIGN PATENT DOCUMENTS

| 734644 | 10/1932 | France | 251/353 |
|---|---|---|---|
| 976597 | 3/1951 | France | 251/353 |

Primary Examiner—George L. Walton
Attorney, Agent, or Firm—Davis Hoxie Faithfull & Hapgood

[57] ABSTRACT

An in-line accessory faucet having a separable plastic air-gap module for use with a reverse osmosis unit, the faucet being installable without the module when used without a reverse osmosis unit. The air-gap module slides onto the faucet pipe conduit below the housing, and has brine flow passages and a channel formed in the top surface and closed off by the overlying flat surface of a base member between the housing and air-gap module. A valve seat in the housing connects to both the housing and the pipe conduit. The valving in the housing has an in-line configuration, with the faucet inlet and outlet being on a common central axis. A mounting nut with an expandable - collapsible portion and peripheral side channels for brine tubes permits mounting of the faucet solely from above the sink lip. A handle with two lower camming surfaces is operated only downwardly to obtain both pressure - controlled flow or locked-on flow. The handle pivots on an axis perpendicular to and intersecting the faucet central axis, and surrounds and operates with rotatable trunnions on the faucet outlet to obtain independent rotation of the handle and faucet outlet. An aesthetic accessory faucet with a simple and economical manufacture, assembly, mounting and operation is accordingly provided.

20 Claims, 6 Drawing Figures

ACCESSORY FAUCET

BACKGROUND OF THE INVENTION

The invention relates to an accessory faucet for use as a water dispenser. The faucet is of an in-line configuration and additionally includes a separable plastic air-gap module for use with a reverse osmosis unit which supplies purified water to the faucet and brine waste flow past an air-gap in the air-gap module as mandated by various government requirements.

Faucets and other valving arrangements generally with an in-line configuration for inlet and outlet flow along a common center line or axis are well known. Such faucets and other valving arrangements generally suffer from various disadvantages relating to the manufacture, assembly, mounting and/or operation thereof. Representative of prior art faucets and other valving arrangements of various configurations are the devices disclosed in U.S. Pat. Nos. 25,853; 428,199; 695,697; 1,016,956; 1,088,822; 1,351,780; 2,551,688; 2,664,266; 4,153,233; and 4,260,130.

Accessory faucets operable with reverse osmosis units and having air-gap means are also well known. Such faucets also suffer from various disadvantages relating to the manufacture, assembly, mounting and/or operation thereof, and generally include such features as air-gap means or bores therefor integrally built into a faucet structure, complex shapes with auxiliary bores to accommodate air gap means generally or brine flow passages specifically, brine flow passages that may become clogged, off-line inlet and outlet configurations, complicated valving, mounting and assembly arrangements, a bulky appearance, etc. Representative of such prior art are the devices disclosed in U.S. Pat. Nos. 3,620,241; 3,967,638; 4,134,419; 4,210,533; and 4,454,891.

SUMMARY OF THE INVENTION

The accessory faucet of the present invention serves to eliminate the disadvantages of the prior art. The invention includes an in-line faucet configuration having a threaded pipe conduit for attachment to a water inlet, a housing containing in-line valving means, a faucet outlet, an operation handle, and a separable plastic air-gap module which can economically and easily be made of plastic to also avoid corrosion and slid onto the pipe conduit so as to be positioned between the faucet housing and a sink lip or the like if the faucet is to be used with a reverse osmosis unit providing purified water. If the faucet is to be used to dispense unpurified water, the separable air gap module is eliminated and the faucet is installed directly upon the sink lip or the like. The separable air-gap module is of a very simple construction with the tops of its brine passages and a connecting channel formed in the top surface of the module being closed off by the lower flat surface of a base member positioned between the housing and module, isolating sealing rings also being provided.

The in-line configuration provides a very simple shape of housing that can be easily and economically manufactured. The pipe conduit, parts of the valving means and the faucet outlet all lie along the common center line to obtain the same advantage, and a valve seat within the housing is attached to and locks together both the housing and pipe conduit. A very simple assembly of parts is provided.

The accessory faucet may be top-mounted through a hole in the sink lip by means of a mounting nut connected on the pipe conduit and having a radially collapsible—expandable portion, which collapses as the mounting nut is inserted through the sink lip hole from above and expands after insertion to lock the nut below the hole. Channels inwardly of the outer periphery of the mounting nut advantageously permit passage therethrough of brine tubes for connection to the air-gap module.

Still further, slotted handle means are provided which encircle the faucet outlet and interact with trunnion means on the faucet outlet defining a pivot axis in a manner providing a strong valve operating mechanism and action and also permitting the handle and the faucet outlet to independently rotate about the center line to thereby provide ease and versatility of operation. The handle operates in a downward direction on one camming surface under continuing hand pressure to obtain water flow from the faucet outlet, and also can be operated in the same downward direction to a further extent onto a second camming surface to lock the faucet in an automatically—on position without hand pressure; operation of the handle solely in the downward direction is easier and more desirable from a usage point of view than conventional accessory faucet handles which operate in a downward direction for pressure—controlled flow but in a vertically upward position for automatically locked - on flow.

Other details and advantages of the present invention are disclosed in the drawings and following detailed description.

DETAILED DESCRIPTION OF INVENTION

Figure 1:
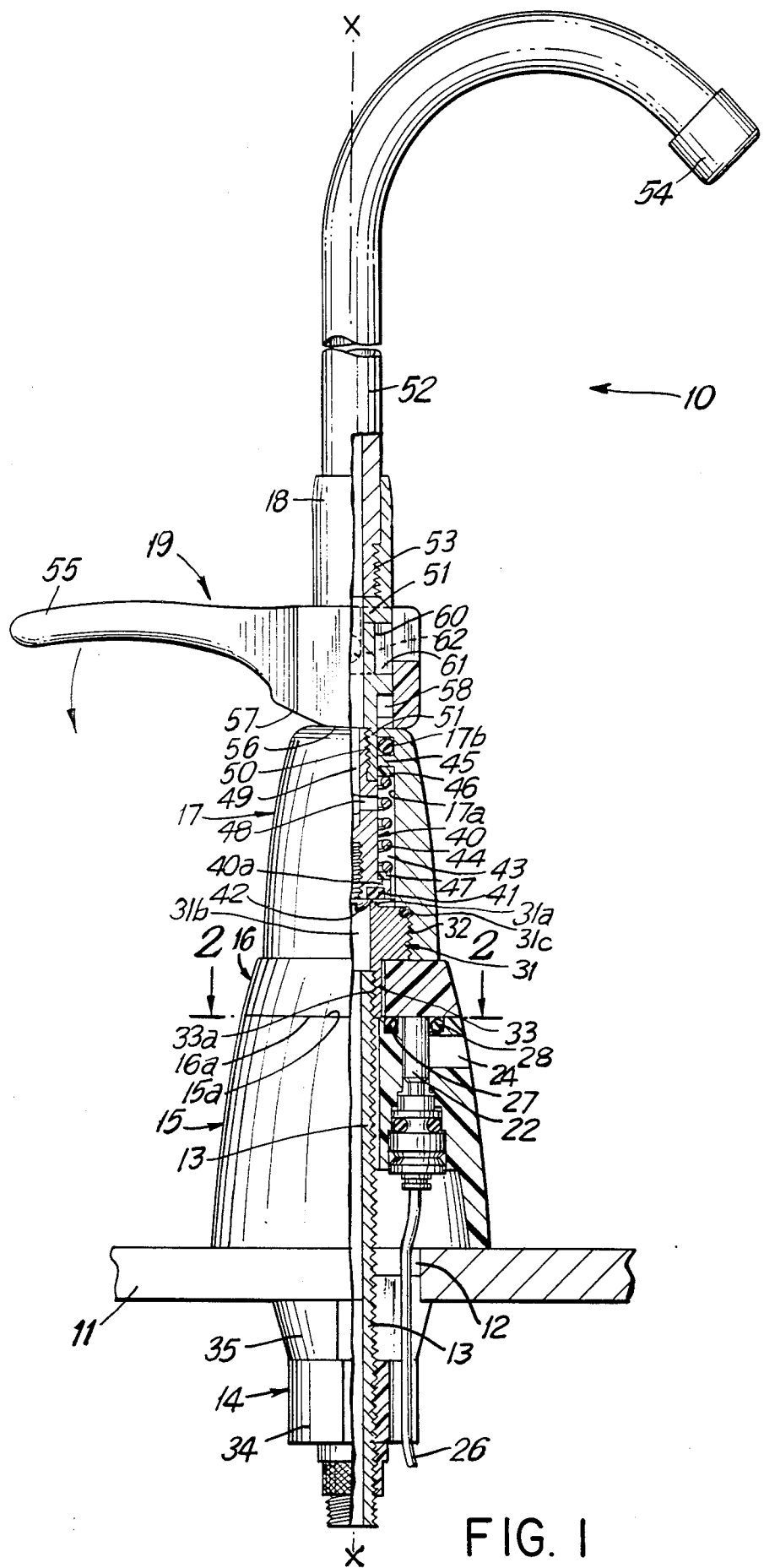
FIG. 1 is a side view of the accessory faucet with the portion to the right side of center line x—x being in vertical section.

Referring to FIG. 1, accessory faucet 10 is shown assembled and mounted on sink lip 11 or the like having mounting hole 12. The parts of accessory faucet 10, except as otherwise indicated, take a generally circular configuration in planes perpendicular to central axis (center line) x—x. Threaded pipe conduit 13 extends through a portion of the accessory faucet and is connected at its lower end to a source of water (not shown) which may be normally available water to a household or purified water from a reverse osmosis purifier. Mounting nut 14 attaches to threaded pipe conduit 13 extending through mounting hole 12, and by virtue of the particular construction of mounting nut 14 (described hereafter), it serves to both secure the accessory faucet 10 to the sink lip and yet allow the faucet 10 to be installed completely from above the mounting hole 12. FIG. 1 further illustrates separable air-gap module 15 above the sink lip surrounding threaded pipe conduit 13; base member 16 overlying air-gap module 15; hollow housing 17 overlying base member 16 and positioned between threaded pipe conduit 13 and faucet outlet 18; and, handle 19 for operating valving means contained within housing 17 to control the flow of water from the water source out the faucet outlet 18.

Separable air-gap module 15 represents an important feature of the present invention. The air-gap module 15 is slidable over threaded pipe conduit 13 during assembly and thus may be utilized where the source of water to the bottom end of pipe conduit 13 is purified water from a conventional reverse osmosis unit. If, however, a reverse osmosis unit is not utilized and the water source to the faucet is such as is available from a well or municipal water supply, etc. without further purification, the air-gap module 15 may be eliminated; in the latter event, base member 16 will rest directly upon sink lip 11 after mounting.

Figure 2:
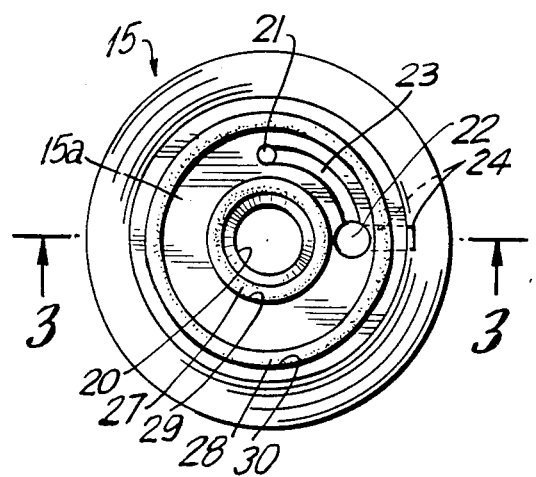
FIG. 2 is an overhead view of the air-gap module taken at the position of lines 2—2 of FIG. 1.
Figure 3:
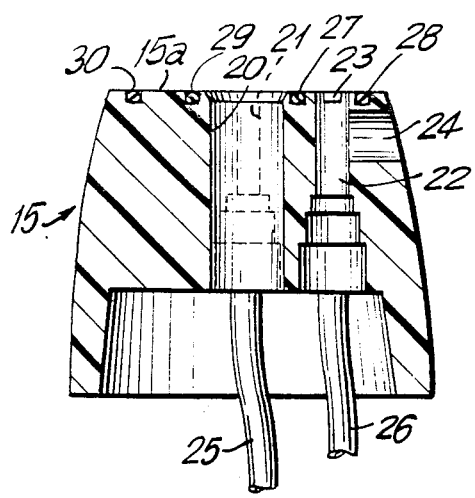
FIG. 3 is a cross-sectional view of the air-gap module taken along lines 3—3 of FIG. 2.

Air-gap module 15, being a separable entity from the remainder of the faucet which includes brass parts hereafter described, is easily, economically and desirably formed solely of plastic. Referring to FIGS. 1-3, air-gap module 15 has central opening 20 of a size sufficient to slide over the threads of pipe conduit 15. Module 15 further has generally vertical brine flow inlet passage 21 and generally vertical brine flow outlet passage 22 channeled therein, inlet passage 21 having a smaller diameter than outlet passage 22 and the passages being separated from one another by a ninety degree angle as shown in FIG. 2. Passages 21 and 22 extend through the top surface 15a of air-gap module 15, and generally horizontal channel 23 formed in said top surface 15a connects inlet and outlet passages 21 and 22. An air gap opening 24 formed in the plastic through the module side wall extends laterally from the atmosphere outside of air-gap module 15 into outlet passage 22. As shown, the air gap 24 is positioned below the top surface 15a of module 15, though it may if desired be extended up to the top surface. The well-known brine inlet and outlet tubes 25 and 26, respectively from the conventional reverse osmosis unit and to waste, are connected to the bottoms of the inlet 21 and outlet 22 brine passages in air-gap module 15 in any suitable water-tight manner.

Base member 16 overlies air-gap module 15, surrounds threaded pipe conduit 13 extending through a central opening of base 16, and has lower flat surface 16a that abuts against top surface 15a of air-gap module 15. When the accessory faucet is tightly assembled with the air-gap module 15, surface 16a of base 16 closes off the top of horizontal channel 23 and the top openings of inlet and outlet passage 21,22 from atmosphere. Brine from the reverse osmosis unit flows in brine inlet tube 25, passes up brine inlet passage 21, strikes surface 16a of base 16, passes across closed horizontal channel 23, and thence passes down brine outlet passage 22 past air gap 24 and out brine outlet tube 26 to waste. The brine will not flow in the reverse direction because of air gap 24. To be sure that the brine flow from the reverse osmosis unit is restricted as set forth above, sealing rings 27,28 set within grooves 29 and 30 in air-gap module top surface 15a serve to surround and isolate the brine inlet and outlet passages 21,22 and horizontal channel 23. The path of brine flow is closed at all points except at the required air gap 24.

As shown in FIGS. 1-3, air-gap module 15 is a plastic member with the above-described features formed therein. Corrosive problems from brine flow therefore are eliminated. Further excess plastic can be removed from the configuration shown, if desired, as long as sufficient plastic material remains where needed to define the above-described features.

Base 16 is comprised of plastic and positioned as shown between brass housing 17 and plastic air-gap module 15. If desired, though less advantageous, housing 17 could have a lower surface of appropriate circumference to perform the functions of lower surface 16a of base 16 to thus eliminate base 16. As shown in the preferred embodiment which includes base 16, hollow brass housing 17 has its inner wall threadably connected to generally tubular brass valve seat 31 at outer periphery 32 of valve seat 31. Valve seat 31 has a downward portion 33 extending between base 16 slid thereon and pipe conduit 13, an inner peripheral surface 33a of which is in turn threadably connected to threaded pipe conduit 13. It will therefore be seen that when valve seat 31 and mounting nut 14 are threadably connected to pipe conduit 13, base 16 and air-gap module 15 can be tightly assembled together with the bottom of air-gap module 15 positioned on sink lip 11. As noted above, the construction of mounting nut 14 permits assembly and mounting solely from above the sink lip 11.

Figure 5:
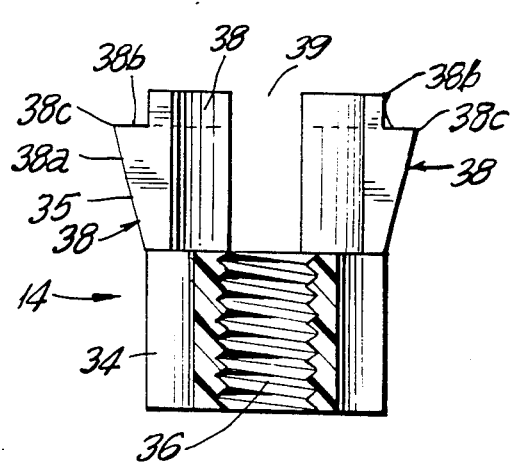
FIG. 5 is a cross-sectional view of the mounting nut taken along 5—5 of FIG. 4.
Figure 4:
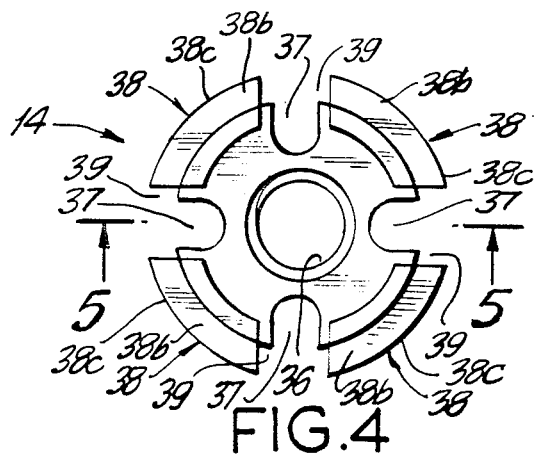
FIG. 4 is an overhead view of the mounting nut.

More specifically, and referring to FIGS. 1,4 and 5, plastic mounting nut 14 includes lower portion 34 and an upper portion 35. Lower portion 34 has a threaded central opening 36 for attachment to pipe conduit 13, and four top to bottom channels 37 in the outer periphery for ready placement and inclusion of brine tubes 25 and 26 in two of the channels regardless of the tightened nut position. The outer circumference of lower nut portion 34 is slightly less than the circumference of mounting hole 12 in sink lip 11. Upper nut portion 35 is comprised of four flexible tab portions 38, which because of their flexibility, are each radially collapsible—expandable. Separations 39 between portions 38 in upper nut portion 35 generally line up in a vertical direction with channels 37 in lower nut portion 34, in order to accommodate brine tubes 25,26. Tab portions 38 of upper nut portion 35 each include a peripheral surface 38a which is flared outwardly in the normal radially expanded position of tab 38 (as shown in FIG. 5), and horizontal flange surface 38b which meets surface 38a at circumferential rim 38c. In the normal radially expanded position of each tab portion 38, the circumference of rim 38c is greater than the circumference of sink lip mounting hole 12 and flange surfaces 38b rest against the bottom of sink lip 11 after the accessory faucet 10 is mounted as shown in FIG. 1.

To mount the accessory faucet 10 from above sink lip 11, air-gap module 15 can be slid onto the lower end of pipe conduit 13 above sink lip 11 to abut base 16, the overlying parts of the faucet having already been assembled. Mounting nut 14 is screwed onto pipe conduit 13 above sink lip 11, and the water supply and brine tube conventional connections are made above the sink lip respectively to pipe conduit 13 and air-gap module 15. The pipe conduit 13 with mounting nut 14 thereon is then pushed downwardly through the mounting hole 12. Lower nut portion 34 being of smaller outer diameter clears mounting hole 12, and the brine tubes in vertical channels 37 present no impediment. Upper nut portion 35 is of larger diameter at rim 38c than hole 12, but since the tab portions 38 are flexible, they are collapsed radially inwardly to allow the upper nut portion 35 to also pass through hole 12. After the entire mounting nut 14 is below hole 12 in sink lip 11, the tab portions 38 expand back outwardly to their normal positions shown in FIG. 5. The faucet's pipe conduit 13 is screwed further into nut 14 from above the sink lip and surfaces 38b of the portions 38 come to rest against the lower surface of sink lip 11 to clamp and hold the accessory faucet 10 in assembled and mounted position on the sink lip.

Referring back to FIG. 1, brass housing 17 includes brass valve stem 40 located on central axis x—x. The lower portion of the valve stem 40 is solid, and has circular washer 41 mounted and held in flange 40a thereof by screw 42 screwed into the lower solid portion of valve stem 40. Valve stem 40 is spaced about its periphery from the inner wall 17a of hollow housing 17 to form a circular channel 43 surrounding valve stem 40 within which water may flow and likewise within which a spring 44 is positioned. Housing 17 has internal circular flange 45, with spring 44 accordingly circling valve stem 40 and captured between housing flange 45 and flange 40a of valve stem 40. If desired, plastic stem guides 46,47 may also be inserted for the spring 44 to act directly against, the stem guides then comprising washers with protrusions at ninety degree spacings about the periphery of the washer to thereby serve both as a stem guide and allow water flow between the protrusions. Valve stem 40 further has a plurality of openings 48 cut through its side wall entering into central water-flow conduit 49 in the upper portion and extending out the top of valve stem 40. Openings 48 may for example comprise four in number spaced at ninety degree intervals about the central axis x—x. The openings 48 may be sized according to the water flow desired out faucet outlet 18. The upper portion of valve stem 40 is threadably connected at an outer periphery 50 to brass tubular upper stem 51 which is threadably connected at an inner periphery 53 to tubular gooseneck 52. Upper stem 51 and gooseneck 52 together comprise faucet outlet 18. An aerator 54 may be attached to the end of the gooseneck 52. Handle 19 is connected to faucet outlet 18 and operated in a manner to be described hereinafter.

When handle 19 is in its non-actuated position as shown in FIG. 1, valve stem 40 and specifically washer 41 at the solid lower portion of valve stem 40 is biased by the action of spring 44 against circular lip 31a of valve seat 31 to prevent water from the water source flowing past the valve seat. However, when handle 19 is actuated in a downward direction, it lifts interconnected gooseneck 52, upper stem 51 and valve stem 40 upwardly against the bias of spring 44 so that washer 41 now clears lip 31a of valve seat 31. Water flow now sequentially passes up pipe conduit 13, through central recess 31b of valve seat 31, between lifted washer 41 and lip 31a of valve seat 31, between flange 40a spaced from the inner wall 17a of housing 17, into channel 43, through openings 48 in the wall of valve stem 40, up central water flow conduit 49, then through the central opening of upper stem 51 and through the central opening of gooseneck 52 to exit the faucet. Sealing ring 17b near the top of housing 17 and sealing ring 31c at the top of valve seat 31 may be used to assure proper confinement of the water flow.

Figure 6:
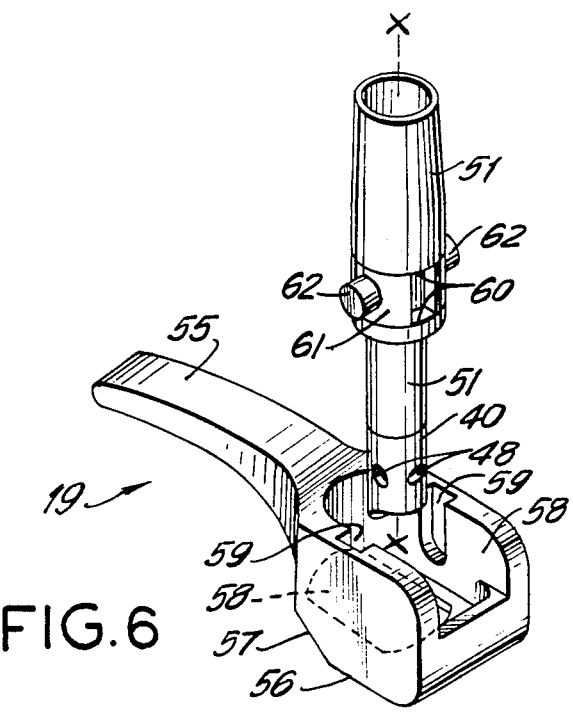
FIG. 6 is a perspective view of the accessory faucet handle and means for mounting to the faucet outlet, the parts being partially disassembled to facilitate understanding.

Turning to the specific construction and operation of handle 19, reference is made to FIGS. 1 and 6. Handle 19, made of plastic, includes handle actuating extension 55, first lower camming surface 56, second lower camming surface 57, a top-to-bottom opening 58 in the handle main body, and identical slots 59 in opposite interior handle side walls defining the opening 58. Brass upper stem 51 of faucet 18 has circumferential groove 60 therein, within which is snapped and contained a split plastic pivot bushing 61 occupying for example three hundred or so degrees of the circumferential groove 60. Bushing 61 is slidable within the groove about the central axis x—x, and has two diametrically opposite trunnions 62. When handle 19 and upper stem 51 are assembled by moving their parts as shown in FIG. 6 toward one another so that handle top-to-bottom opening 58 surrounds upper stem 51, trunnions 62 slide down into handle slots 59 to the bottom thereof, thus serving as pivot points together defining a pivot axis for handle 19.

When handle extension 55 is operated to a slightly lower position from the non-actuated position of FIG. 1, first lower camming surface 56 engaging the top of housing 17 is cammed slightly against the top of housing and valve stem 40 is therefore lifted (via the bottom of the handle slots 59 acting upwardly against trunnions 62 to lift interconnected upper stem 51 and valve stem 40) to cause water flow out the faucet outlet 18. When pressure on the handle actuating extension 55 is released, spring 44 biases valve stem 40 back downwardly to seat washer 41 against valve seat lip 31a and stop the flow of water, with handle 19 automatically returning to the original FIG. 1 position. If handle extension 55 is operated to a lower position of greater extent, however, second camming surface 57 (at an angle to first camming surface 56) is pivoted into contact with the top of housing 17 and first camming surface 56 is accordingly pivoted out of contact with the top of housing 17. Again, valve stem 40 has lifted to cause water flow out the faucet outlet, but when pressure on handle extension 55 is released, second camming surface 57 remains in contact with the top of housing 17 and the faucet remains in an automatically-on water-flow condition without any pressure applied to handle extension 55. Second camming surface 57 engaging the top of housing 17 retains the valve seat 40 in lifted position against the bias of spring 44. To turn the faucet off from its automatically-on position, handle extension 55 is physically lifted back to its FIG. 1 position so that first camming surface 56 returns to contact, and second camming surface 57 leaves contact, with the top of housing 17. Spring 44 then biases valve stem 40 downwardly to again seat washer 41 against valve seat lip 31a.

It will be noted that by virtue of pivot bushing 61 being slidable in circumferential groove 60 (FIG. 6), faucet outlet 18 (upper stem 51 and gooseneck 52) and handle extension 55 can be rotated independently of one another through a full circle in planes perpendicular to central axis x—x. When handle extension 55 so rotates, it rotates pivot bushing 61 on upper stem 51. When faucet outlet 18 so rotates, it rotates within pivot bushing 61 and there are no impediments in the remainder of the faucet construction to prevent such rotation. This feature permits great versatility in allowing gooseneck 52 to be rotated to a convenient water-delivery position without rotating handle extension 55, and handle extension 55 to be rotated to convenient position for its operator without moving the water-delivering position of the gooseneck 52. Further, handle extension 55 may be rotating to a position one hundred and eighty degrees from that shown in FIG. 1, so that the handle extension 55 underlies the water flow and can be operated by pressing a container to be filled downwardly against the handle extension to thereby fill the container.

It further will be noted from the above description and drawings that, in addition to the separable plastic air-gap modular feature, all the parts of the accessory faucet of the present invention essentially surround and are centered on the same center-line, central axis x—x. Further, the water flow in and out of the accessory faucet is along central axis x—x, since the water flow from pipe conduit 13 that deviates past valve seat 31 and into channel 43, enters back into the center line of water-flow conduit 49 in the upper portion of valve stem 40. This in-line construction and operation permits parts with simpler shapes to be utilized, thus requiring less machining, molding, routing, channeling, etc. operations in manufacturing the individual parts, and simplifying assembly.

Still further, the pivoting of the handle 19 occurs about an axis perpendicular to and intersecting central axis x—x by virtue of diametrically opposite trunnions 62 and handle slots 59. Trunnions 62 and pivot bushing 61 in groove 60 further provide excellent load distribution when the handle 19 is operated. This arrangement in conjunction with first and second camming surfaces 56,57 and handle extension 55 provides a very strong valve operating mechanism and action for the faucet.

It is understood that various changes and modifications may be made in the foregoing without departing from the spirit and scope of the invention as hereafter claimed.

What is claimed is:

1. An accessory faucet, comprising in combination a threaded pipe conduit for connection to a water inlet; a faucet outlet; a hollow housing positioned between the threaded pipe conduit and the faucet outlet; means connecting the housing to the threaded pipe conduit; valving means within the housing to control water passage from the threaded pipe conduit to the faucet outlet; a handle to operate the valving means; a separable plastic air-gap module slidable over the threaded pipe conduit and positioned below the housing to surround the threaded pipe conduit; said air-gap module having an upper surface, a side wall, and generally vertical brine inlet and outlet passages formed in the plastic for connection at the bottom thereof to a brine tube from a reverse osmosis system and a brine tube to waste respectively, and an air-gap opening to atmosphere formed in the plastic through the side wall along the brine outlet passage, a generally horizontal closed channel connecting the brine inlet and outlet passages at the top of the air-gap module; means overlying the air-gap module and closing off the top openings of the brine inlet and outlet passages from atmosphere, said overlying means and said air-gap module together defining therebetween the generally horizontal closed channel; and, means attachable to the threaded pipe conduit to hold the accessory faucet in assembled condition on a sink lip or the like.

2. The invention of claim 1, wherein the means overlying the air-gap module comprises a base member surrounding the threaded pipe conduit and positioned between the housing and the air-gap module, said base member having a lower flat surface forming the top of the generally horizontal closed channel and the remainder of the channel being formed in the upper surface of the air-gap module.

3. The invention of claim 1, further comprising sealing ring means positioned on the upper surface of the air-gap module to surround and isolate the brine inlet and outlet passages and connecting horizontal channel in order to maintain brine flow from the brine inlet passage solely to the horizontal channel and brine outlet passage.

4. The invention of claim 1, wherein the means connecting the housing to the threaded pipe conduit comprises a valve seat threadably connected at its outer periphery to the housing and threadably connected at its inner periphery to the threaded pipe conduit.

5. The invention of claim 1, wherein the means to hold the accessory faucet in assembled condition on a sink lip or the like comprises a mounting nut, said mounting nut having a portion threadably connected to the threaded pipe conduit and a radially collapsible-expandable portion which upon collapsing allows the mounting nut to be passed through a mounting hole of a given diameter in the sink lip or the like and upon expansion after passage therethrough assumes a diameter greater than the diameter of the mounting hole, said mounting nut further having generally vertical channels extending inwardly of its outer periphery to permit the passage therethrough of brine tubes to be connected to the brine inlet and outlet passages of the air-gap module.

6. The invention of claim 1, wherein the threaded pipe conduit and the faucet outlet have a common central axis.

7. The invention of claim 6, wherein the handle pivots about an axis perpendicular to and intersecting the common central axis of the threaded pipe conduit and the faucet outlet.

8. The invention of claim 6, wherein the housing includes a valve seat with a central opening in water-flow communication with the threaded pipe conduit; the valving means comprises a valve stem centrally located within the housing and spaced from the housing interior wall; said valve stem including a solid lower portion having means engageable with the valve seat, a central water-flow conduit in its upper portion, and at least one opening through the valve stem side wall connecting the space between the valve stem and the housing interior wall to the central conduit in the upper valve stem portion; spring means within the housing biasing the valve stem against the valve seat; said valve stem upper portion being connected to the faucet outlet; and, means connecting the handle to the faucet outlet; whereby, when the handle is actuated it lifts the faucet outlet and valve stem against the spring bias off the valve seat to permit water to flow from the threaded pipe conduit over the valve seat, into the space between the valve stem and housing interior wall, through the opening in the valve stem side wall into the central conduit in the upper valve stem portion, and out the faucet outlet.

9. The invention of claim 8, wherein the valve stem lower portion has a washer mounted therein, the valve seat has a lip thereon, and the washer seals against the lip when the valve stem and valve seat are engaged.

10. The invention of claim 8, wherein the valve stem and housing interior wall have respective flanges and stem guides adjacent thereto, said spring means being positioned between said stem guides.

11. The invention as is any one of claims 1, 6 or 8 wherein the handle has an actuating extension, first and second lower camming surfaces separately engageable with the top of the housing, a top-to-bottom opening surrounding the outlet faucet, and slots in interior side walls of the handle defining the top-to-bottom opening; said outlet faucet including trunnion means inserted into said slots and defining an axis for the handle to pivot about; whereby, when the handle extension is actuated to a slightly lower position and thereafter released, the first camming surface is and remains engaged with the top of the housing and the valve stem is automatically spring biased back into engagement with the valve seat; and, when the handle extension is actuated to a lower position of greater extent and thereafter released, the second camming surface becomes engaged with the top of the housing and the valve stem is automatically held in a separated position from the valve seat until the handle extension is actuated upwardly.

12. The invention of claim 11, wherein the faucet outlet has a circumferential groove and a pivot bushing with trunnions thereon inserted within and slidable about the circumferential groove, whereby the faucet outlet and the handle may be independently rotated about the faucet outlet central axis.

13. An in-line accessory faucet, comprising in combination a threaded pipe conduit for connection to a water inlet; a faucet outlet; the threaded pipe conduit and the faucet outlet having a common central axis; a hollow housing positioned between the threaded pipe conduit and the faucet outlet; means connecting the housing to the threaded pipe conduit including a valve seat threadably connected at its outer periphery to the housing and threadably connected at its inner periphery to the threaded conduit pipe, the valve seat having a central opening in water-flow communication with the threaded pipe conduit; support means surrounding the threaded interconnection of the pipe conduit and the valve seat, said support means underlying and supporting the housing; valving means within the housing to control water passage from the threaded pipe conduit to the faucet outlet; a handle to operate the valving means and having first and second lower camming surfaces separately engageable with the housing; means to hold the accessory faucet in assembled condition on a sink lip or the like; the valving means comprising a valve stem centrally located within the housing and spaced from the housing interior wall; said valve stem including a solid lower portion having means engageable with the valve seat, a central water-flow conduit in its upper portion, and at least one opening through the valve stem side wall connecting the space between the valve stem and the housing interior wall to the central conduit in the upper valve stem portion; spring means within the housing biasing the valve stem against the valve seat; said valve stem upper portion being connected to the faucet outlet; and, means connecting the handle to the faucet outlet; whereby, when the handle is actuated it lifts the faucet outlet and valve stem against the spring bias off the valve seat to permit water to flow from the threaded pipe conduit over the valve seat, into the space between the valve stem and housing interior wall, through the opening in the valve stem side wall into the central conduit in the upper valve stem portion, and out the faucet outlet.

14. The invention of claim 13, said support means including a base member positioned between the housing and the means to hold the accessory faucet in assembled condition on a sink lip or the like.

15. The invention of claim 13, wherein the means to hold the accessory faucet in assembled condition on a sink lip or the like comprises a mounting nut, said mounting nut having a portion threadably connected to the threaded pipe conduit and a radially collapsible-expandable portion which upon collapsing allows the mounting nut to be passed through a mounting hole of a given diameter in the sink lip or the like and upon expansion after passage therethrough assumes a diameter greater than the diameter of the mounting hole.

16. The invention of claim 13, wherein the valve stem lower portion has a washer mounted therein, the valve seat has a lip thereon, and the washer seals against the lip when the valve stem and valve seat are engaged.

17. The invention of claim 13, wherein the valve stem and housing interior wall have respective flanges and stem guides adjacent thereto, said spring means being positioned between said stem guides.

18. The invention of claim 13, wherein the handle pivots about an axis perpendicular to and intersecting the common central axis of the threaded pipe conduit and the faucet outlet.

19. An in-line accessory faucet, comprising in combination a threaded pipe conduit for connection to a water inlet; a faucet outlet; the threaded pipe conduit and the faucet outlet having a common central axis; a hollow housing positioned between the threaded pipe conduit and the faucet outlet; means connecting the housing to the threaded pipe conduit including a valve seat threadably connected at its outer periphery to the housing and threadably connected at its inner periphery to the threaded conduit pipe, the valve seat having a central opening in water-flow communication with the threaded pipe conduit; valving means within the housing to control water passage from the threaded pipe conduit to the faucet outlet; a handle to operate the valving means, said handle having an actuating extension and having first and second lower camming surfaces separately engageable with the housing; means to hold the accessory faucet in assembled condition on a sink lip or the like; the valving means comprising a valve stem centrally located within the housing and spaced from the housing interior wall; said valve stem including a solid lower portion having means engageable with the valve seat, a central water-flow conduit in its upper portion, and at least one opening through the valve stem side wall connecting the space between the valve stem and the housing interior wall to the central conduit in the upper valve stem portion; spring means within the housing biasing the valve stem against the valve seat; said valve stem upper portion being connected to the faucet outlet, and, means connecting the handle to the faucet outlet, said handle having a top-to-bottom opening surrounding the outlet faucet and slots in interior side walls of the handle defining the top-to-bottom opening, and said outlet faucet including trunnion means inserted into said slots and defining an axis for the handle to pivot about; whereby, when the handle is actuated it lifts the faucet outlet and valve stem against the spring bias off the valve seat to permit water to flow from the threaded pipe conduit over the valve seat, into the space between the valve stem and housing interior wall, through the opening in the valve stem side wall into the central conduit in the upper valve stem portion, and out the faucet outlet; and whereby, when the handle extension is actuated to a slightly lower position and thereafter released, the first camming surface is and remains engaged with the top of the housing and the valve stem is automatically spring biased back into engagement with the valve seat, and when the handle extension is actuated to a lower position of greater extent and thereafter released, the second camming surface becomes engaged with the top of the housing and the valve stem is automatically held in a separated position from the valve seat until the handle extension is actuated upwardly.

20. An in-line accessory faucet, comprising in combination a threaded pipe conduit for connection to a water inlet; a faucet outlet; the threaded pipe conduit and the faucet outlet having a common central axis; a hollow housing positioned between the threaded pipe conduit and the faucet outlet; means connecting the housing to the threaded pipe conduit including a valve seat threadably connected at its outer periphery to the housing and threadably connected at its inner periphery to the threaded conduit pipe, the valve seat having a central opening in water-flow communication with the threaded pipe conduit; valving means within the housing to control water passage from the threaded pipe conduit to the faucet outlet; a handle to operate the valving means and having first and second lower camming surfaces separately engageable with the housing; means to hold the accessory faucet in assembled condition on a sink lip or the like; the valving means comprising a valve stem centrally located within the housing and spaced from the housing interior wall; said valve stem including a solid lower portion having means engageable with the valve seat, a central water-flow conduit in its upper portion, and at least one opening through the valve stem side wall connecting the space between the valve stem and the housing interior wall to the central conduit in the upper valve stem portion; spring means within the housing biasing the valve stem against the valve seat; said valve stem upper portion being connected to the faucet outlet; and, means connecting the handle to the faucet outlet, whereby, when the handle is actuated its lifts the faucet outlet and valve stem against the spring bias off the valve seat to permit water to flow from the threaded pipe conduit over the valve seat, into the space between the valve stem and housing interior wall, through the opening in the valve stem side wall into the central conduit in the upper valve stem portion, and out the faucet outlet; the faucet outlet having a circumferential groove and a pivot bushing with trunions thereon inserted within and slideable about the circumferential groove, the handle having means to engage the trunions, whereby the faucet outlet and the handle may be independently rotated about the faucet outlet central axis.

* * * * *